June 23, 1964            W. WHITE            3,138,059

MEANS AND METHOD FOR PRODUCING IMAGE OF PAPILLARY RIDGES

Filed May 21, 1962            2 Sheets-Sheet 1

WYMAN WHITE
INVENTOR.

BY *H.C. Goldwire*

AGENT

June 23, 1964     W. WHITE     3,138,059
MEANS AND METHOD FOR PRODUCING IMAGE OF PAPILLARY RIDGES
Filed May 21, 1962     2 Sheets-Sheet 2

WYMAN WHITE
INVENTOR.

BY *H.C. Goldwire*
AGENT

United States Patent Office 3,138,059
Patented June 23, 1964

3,138,059
MEANS AND METHOD FOR PRODUCING IMAGE OF PAPILLARY RIDGES
Wyman White, Dallas, Tex., assignor to Ling-Temco-Vought, Inc., Dallas, Tex., a corporation of Delaware
Filed May 21, 1962, Ser. No. 196,296
15 Claims. (Cl. 88—24)

This invention relates to a means and method for producing an optical image of papillary ridges and more particularly to such a means and method wherein no ink or other chemical is employed on the body part whose papillary ridges are imaged.

It previously has been proposed to record by photographic means the appearance of a body member bearing papillary ridges and placed in contact with a transparent body, and it is believed that all these proposals have fallen in two general classes.

In the first class, a mere photograph of a finger, hand, etc. is taken through a glass plate on which the photographed part is placed. The body part itself is illuminated through the glass by a lamp placed on the same side of the glass as the objective lens focusing the light returned from the hand. The glare which the lamp produces is avoided by placing the body part where it is out of the glare area as seen by the lens, and obliteration of the body part image by the glare light thus is avoided. A good image of the hand, for example, can be recorded in this way, with hand shape, rings on the fingers, etc. showing clearly. Because the papillary ridges are imaged in the light which they have themselves reflected, they appear in their natural color and offer little or no contrast to the valleys between them. For this reason, the above-described method has been of little or no worthwhile value in the recording of papillary ridge patterns.

In the second class, utilization is made of the interruption of internal reflection by a surface when a papillary ridge is placed against the surface. This has not been regarded as possible where a plate is utilized as described above, for the quantity of light reflected by the nearer face to the lamp (termed herein the rear face) is even greater than that reflected internally from the front face, and any image contained in the front-face glare thus is obscured by the heavy rear-face glare. Consequently, glare areas have been avoided and the body part placed in contact with the plate in some other area of the plate in which the chief portion of the light received by the focusing lens is that reflected by the body part rather than internally of the plate by the plate front face. Where prisms have been used, however, the geometric relations are different, and it is readily possible to introduce through a first face of a prism a bundle of light which is totally internally reflected from a second face and which exits from a third. Since the objective lens views the emerging light and not the first face, glare from the first face is of no consequence. In all of these devices utilizing a prism, the light is internally incident on the second face at a supercritical angle and hence is internally reflected, by the second face, through the third face. By virtue of the total internal reflection, an apparently excellent "glare area" is seen at the second face by a lens viewing the same through the third face, and the second face appears silvery except where contacted by a papillary ridge, the area of ridge contact appearing black. Excellent detail and contrast are obtained, and at first glance this would seem an ideal way of producing an image of papillary ridges. Such devices, however, have been very disappointing in that radically excessive distortions produced by the prism have made too difficult and uncertain the comparison of fingerprints, etc., produced in this way, with the already large files of inked prints. Expedients proposed for reducing these distortions have been of no avail, and the devices in addition have been handicapped by problems of focus which arise, because of the slanted reflecting face of the prism, from the depth of the field viewed by the objective lens. Dispersion, by the prism, of the colors of the light passed through it also reduces the quality of the papillary ridge image. Because of the above-mentioned problems, therefore, this second class of device has not proved practically useful.

It is a major object of the present invention to provide a greatly improved means and method for producing an optical image of papillary ridges.

Another object is to enable the production of a sharp, clear image of papillary ridges in which the ridges are dark and the valley areas light, thus making possible direct comparison of the image with an inked fingerprint or the like.

A related object is to enable the production of an image of papillary ridges sharply exhibiting the details of pores and the like, which details are not evident in inked prints.

A further object is to enable the production of a clear, sharply detailed image of papillary ridges which is not distorted to any significant degree.

An additional object is to provide a device for producing an optical image of papillary ridges in which the depth of the field viewed by a lens employed for focusing the image is very small or zero and thus introduces substantially no problems whatever in focusing the image.

A still further object is to provide a device for producing and recording an image of papillary ridges which is simple and relatively rugged in construction.

Additional objects are to provide an improved method of producing and recording an optical image of papillary ridges and for producing and recording an optical image of papillary ridges on a plurality of body parts.

Other objects and advantages will be apparent from the specification and claims and from the accompanying drawing illustrative of the invention.

The present invention utilizes an internally reflecting front surface of a plate whose reflection is locally disrupted by contact with papillary ridges. As an important feature of the invention, however, the light is incident on the reflecting surface at less than a critical angle; and the finger or other body part is placed in the glare area viewed by the objective lens. The image in the glare light reflected by the finger-contacting surface is made sharply visible by substantially eliminating the glare from the plate rear face. Not only is an image of excellent contrast and detail produced, but problems of distortion, focus, and color dispersion are eliminated. Detailed description of the invention follows below.

Figure 1:
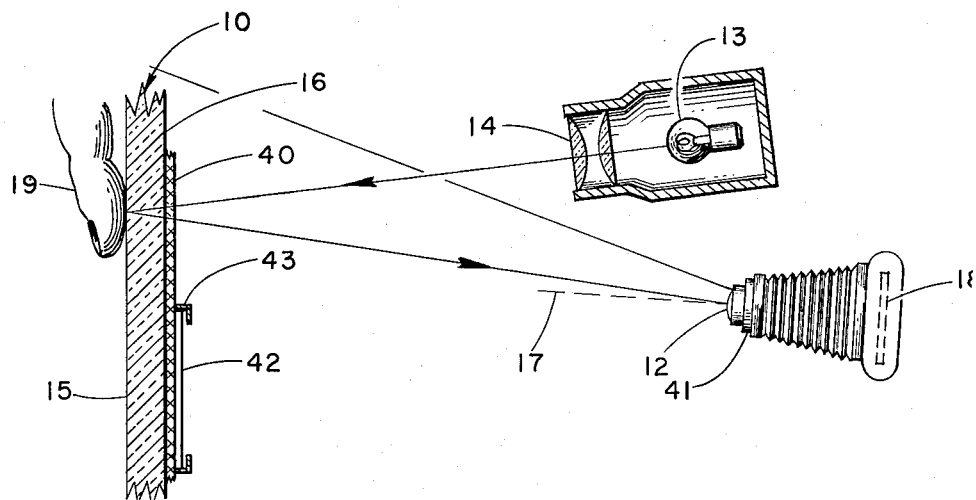
FIGURE 1 is a schematic representation of one form of the invention.

In FIGURE 1, a device for producing and recording an optical image of papillary ridges comprises a plate 10 made of glass, a plastic, or other transparent material. The plate front face 15 is accessible to provide a contact area against which may be brought a finger, foot, or other body part or member 19 having papillary ridges. Substantially parallel to the front face, the plate rear face 16 is provided with an optical, low-reflectance coating 40 such as may be produced on the glass surface by dissolving out some of the constituents of the glass, by the deposition of materials, such as magnesium fluoride on its surface, or by other means known in the art. The thickness of the coating 40 should be in accordance with standard optical practice and of course is much exaggerated in the drawing. The glass 10 itself, in a typical example, is a piece of plate glass approximately 0.25 inch in thickness. The front face 15 is without anti-reflective coating and is clear; alternatively, the front face is frosted by abrasion, deposition of an added material on the plate face, etc. The frosting should not be deep but, if employed, preferably is dense.

The light source must be relatively intense because most of the light passes entirely through the plate and only a little (roughly, less than 5%) is reflected by the front face 15 back again through the rear face 16 when the front face is clear. More light is reflected at the front face 15 where the latter is frosted. The light source 13 must provide a glare area large enough to include all of the area of the member or members in which it is desired to record the skin pattern, and the various portions of the glare area preferably are relatively uniform in light intensity. Excellent results are obtained when the illumination produced by the light source 13 is passed through a light-concentrating device such as a condenser lens arrangement 14; the desired intensity, uniformity, and size of glare area are obtained, and the image is of superior quality in that it is characterized by very desirably high detail and contrast. In addition, only the papillary ridge pattern is present in the image; there is little or no imaging of the hand, foot, etc. bearing the ridges. A collimating lens also is employable instead of the condenser lens, although in most applications the condenser lens is preferred. Where a collimating lens is used, no focusing means is required, and the front face is not frosted.

The means for focusing, on a suitable surface, light reflected interiorly of the plate in the glare area in which the finger or other body part is placed comprises an objective lens 12 positioned to intercept the light reflected by the front face 15 through the rear face. Vertically and laterally, the objective lens 12 and light source 13 are placed as physically near each other as expedient in order that the angle of incidence and reflection of the light at the front face 15 will be small. There is no objection to the objective lens 12 being placed either nearer to or farther from the plate 10 than the light source 13. An angle of incidence, of the light on the plate rear face 16, of up to 20 degrees has been found to yield good results. The surface on which the light refracted by the lens 12 is incident is substantially parallel to the plate front surface 16 and may be a screen or ground glass or, as in the drawing, a photographic film or plate 18. Good results typified by complete elimination of problems of distortion and focus are obtained when the axis 17 of the lens 12 is perpendicular to the plate, but some tilting of the lens axis is required for making the center of the glare area approximately in coincidence with a desired portion of the field of view of the lens 12. A tilt of the lens axis 17 of up to ten degrees has been employed without encountering difficulties in focus or introducing any discernible distortion, and a tilt of 2½ to 3 degrees is used in a preferred embodiment. A conventional shutter device 41 is employed in association with the objective lens 12.

A card or similar body 42 for carrying identifying indicia, such as the name etc. of the subject whose papillary ridge pattern is recorded, is placed to be illuminated by the light source 13 and viewed by the lens 12. The card 42 need not be in the area seen as a glare by the lens 12, for reflection of light by the card is diffuse and presents an image to the lens. The card 42 is mounted on a face of the plate 10 by a suitable clip or slide 43.

In operation of the device for producing an optical image of papillary ridges, light is directed from the light source 13 through the plate rear face 16 onto the front face 15 at less than a critical angle. Glare from the rear face 16 is eliminated by the optical, anti-reflective coating 40. While most of the light incident on the front face 15 passes through the same, some is reflected internally of the plate 10 and passes out again through the rear face 16. In this manner, a glare area is formed on the front face 15 which is viewed by the objective lens 12.

The member 19 bearing papillary ridges then is placed in contact with the plate front face 15 within the glare area viewed by the lens 12. A bright glare is transmitted to the lens 12 from areas of the front face 15 not contacted by the papillary ridges, but wherever the plate 10 forms an interface with a papillary ridge, the internal reflection by the front face 15 is disrupted. Much, if not virtually all, the light passed through the front face 15 into the ridge fails to return again or, if returned, passes in such direction that it is not received by the lens 12; thus, the areas of the front face 15 contacted by the papillary ridges appear very dark and are in high contrast with the bright field produced in areas not contacted by the papillary ridges. The light reflected by the front face 15, in the glare area, through the rear face is focused on the surface provided by the screen or photosensitive film 18 to form a clear, highly detailed image of the papillary ridges.

Where a graphic record of the identity of the person whose skin pattern is imaged is to be made simultaneously with recording the image of the skin pattern, the card 42 is marked with the desired data and placed in the card holder 43 against a face of the plate 10. The card 42, of course, is placed out of register with the area contacted by the body member 19 in order that it will not obscure the image formed by contact of papillary ridges with the front face 15. The film 18 then is exposed to record simultaneously the skin pattern and the data on the card.

A latent print left on the plate front face 15 in the glare area produces an adequate image, and advantage is taken of this in instances where it is desired to record an optical image of papillary ridges on a plurality of body parts and it is impractical to contact the plate 10 simultaneously with all the parts. To cite an example, it is not feasible to attain a flat contact of the thumb of most hands with a plate simultaneously with similar contact of the fingers with the plate. According to the present method, the front face 15 is contacted by the thumb in a first area which, upon light being directed on the plate from the light source 13, lies within the glare area viewed by the lens 12. The thumb is removed from the plate 10 and the fingers are placed in contact with the front face 15 in a second area lying within the glare area. With the light source 13 directing light into the plate 10 in the manner described, the lens 12 focuses the light reflected by the plate front face 15 on the photographic film 18 to record the image of the papillary ridges of the thumb and fingers. To provide another example, the thumb or finger of a mother newly delivered of a child may be pressed against the plate front face 15 in a first, allotted area and removed to leave a latent print on the glass. The foot of the child then is pressed and held against the plate front face 15 in a second area and the skin patterns of mother and child are recorded photographically. The extremely fine detail and lack of ridge protrusion above the valleys immediately following birth has previously made it impossible to obtain fully satisfactory footprints of newborn infants. An excellent infant footprint, far superior to any produced before, is provided by the present method, and since no ink, etc. is used, the pores in the papillary ridges are not filled and hence stand out clearly in the optical image. The card 42 is marked to supply information relative to the mother and child and placed within view of the lens 12 before the film 18 is exposed to record the data on the card together with the skin patterns.

Figure 2:
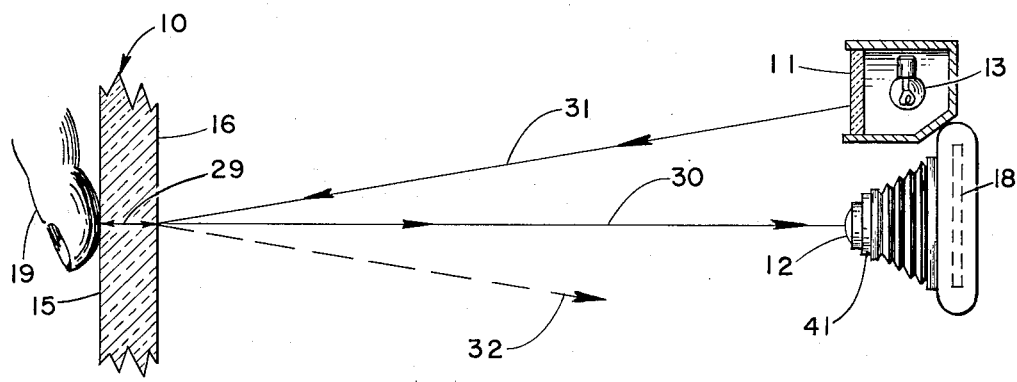
FIGURE 2 is a schematic view of a modification.

FIGURE 2 shows a form of the device in which the lens 12 is placed to receive light reflected by the front face 15 at substantially 90 degrees to the latter. The axis of the lens 12 is substantially perpendicular to the plate front face 15. A condenser lens may be employed as in FIGURE 1, or light from the light source 13 is passed through a diffuser such as an opal or frosted glass 11. Ray 31 from the light source 13 enters the plate rear face 16 at an angle thereto which is so related to the index of refraction of the plate 10 that the light is refracted into perpendicularity with the front face. Substantially all the light passes through the front face 15 where the latter is contacted by ridges of the body part 19; in areas where the glass is not contacted by papillary ridges (e.g., areas in register with the valleys), some of the light is internally reflected perpendicularly to the front face. Striking normal to the rear face 16 as along line 29, this light is not refracted but passes along line 30 to the lens 12. Not all the light initially incident on the rear face 16 passes through the same; some is reflected as along line 32 and passes outside the view of the lens 12. Glare from the rear face 16 thus is disposed of with no reliance (or at least lessened reliance) on an optical coating on the rear face 16.

Figure 3:
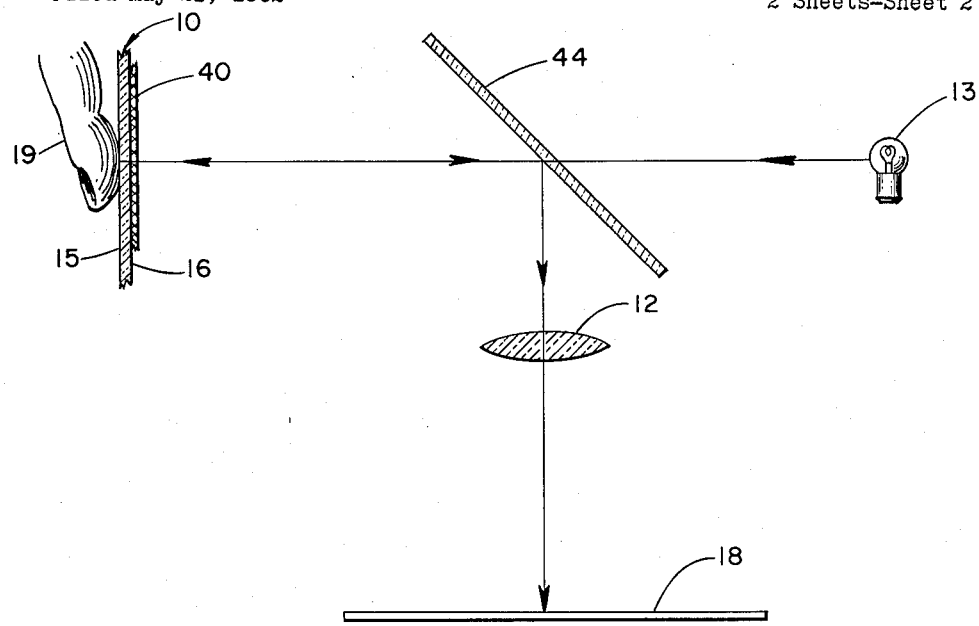
FIGURE 3 is a similar view of another modification.

In FIGURE 3, the lens 12 and film 18 are perpendicular to the reflected light, and the lens axis is parallel with the plate front face 15. Distortion is substantially zero, as is the depth of the field viewed by the lens 12. A half-silvered mirror 44 is placed at 45 degrees to the plate 10 between the latter and the light source 13. Light passing through the mirror 44 and coated rear face 16 of the plate 10 is absorbed in areas of the front face 15 contacted by papillary ridges and partially reflected in other areas back to the mirror 44 from which it is reflected again to the lens 12 and focused by the latter on the screen or film 18.

Figure 4:
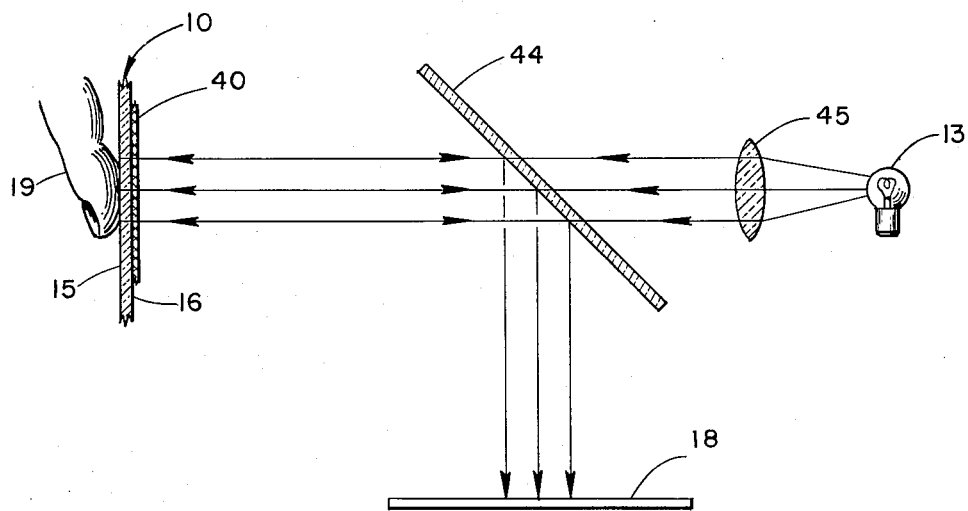
FIGURE 4 is a schematic view of still another modification.

The device of FIGURE 4 is similar to that of FIGURE 3 but employs a collimating lens 45. Since it is not required for focusing the collimated light, no objective lens is employed between the half-silvered mirror 44 and screen or film 18. Again, no frosting is employed on the plate front face 15 where collimated light is used.

Where the plate front face is frosted, as was described in connection with the plate 10 of FIGURE 1, the frosting is caused by microscopic, prismatic shapes deposited on or cut into the glass or other transparent medium. There is total internal reflection at each small prism which is interrupted if contacted by a portion of a papillary ridge. Without the frosting, a quite strong light source 13 is needed since only a small fraction of the light is reflected at the front face 15. With the more nearly total internal reflection provided by the frosting, less light is needed and contrast is improved in that the valley areas are less illuminated. The better contrast is accompanied by improved ridge detail. Less light reaches the valley areas to be reflected therefrom to the lens 12; therefore, less of an image of the ridge-bearing member 19 is produced, and the dark ridge image sharply contrasts with the bright areas where the front face 15 is not contacted.

While only one embodiment of the invention, together with modifications thereof, has been described in detail herein and shown in the accompanying drawing, it will be evident that various further modifications are possible in the arrangement and construction of the device and in the steps of the method without departing from the scope of the invention.

I claim:

1. A device for producing an optical image of papillary ridges comprising:
    a transparent body having front and rear faces, the front face having a contact area adapted for being contacted by papillary ridges;
    an optical, anti-reflective, transparent coating on the the body rear face;
    a light source positioned to transmit light through the rear face and coating onto the front face at an angle wherein part of the light is internally reflected by the front face, in the contact area, through the rear face;
    a surface;
    and a lens positioned to receive the light internally reflected in the contact area by the front face and to focus the light on the surface,
    whereby light reflection from the transparent body rear face to the lens is largely eliminated by the coating and an image of papillary ridges, upon the same being placed in contact with the front face, appears in the light internally reflected by the front face and focused by the lens on the surface.

2. The device recited in claim 1, the body front face being frosted in the contact area.

3. A device for producing an optical image of papillary ridges comprising:
    a plate made of a transparent material and having front and rear, substantially parallel faces, the front face having a contact area adapted for being contacted by papillary ridges;
    an optical, anti-reflective, transparent coating on the body rear face;
    a light source transmitting light through the rear face and coating into incidence on the front face at less than a critical angle to form a glare area including the contact area and to be in part reflected by the front face from the glare area and through the rear face;
    a surface;
    and a lens positioned to intercept light from the light source internally reflected by the glare area of the plate front face through the rear face and to focus the light on the surface,
    whereby light reflection from the transparent body rear face to the lens is largely eliminated by the coating and an image of papillary ridges, upon the same being placed in contact with the front face, appears in the light internally reflected by the front face and focused by the lens on the surface.

4. A device for producing an optical image of papillary ridges comprising:
    a plate made of a transparent material and with substantially parallel front and rear faces, the front face having a given contact area adapted for being contacted by a body part with papillary ridges and the rear face having an optical, anti-reflective, transparent coating thereon;
    a light source transmitting light through the rear face and coating onto the front face at less than a critical angle to form thereon a glare area including the contact area and from which light is reflected by the front face through the rear face;
    a lens positioned to receive and refracting the light internally reflected by the front face in the glare area through the rear face;
    and a surface on which the light refracted by the lens is incident,
    whereby light reflection from the transparent body rear face to the lens is largely eliminated by the coating and an image of papillary ridges, upon the same being placed in contact with the front face, appears in the light internally reflected by the front face and focused by the lens on the surface.

5. The device recited in claim 4, the lens axis being tilted less than 10 degrees relative to a perpendicular to the plate.

6. The device recited in claim 4, the front face being frosted in the glare area.

7. The device recited in claim 4 and further comprising a condenser lens between the light source and plate rear face.

8. The device recited in claim 4 and further comprising means for mounting a body adapted for carrying identifying indicia in fixed relation to the plate and in the field of view of the lens.

9. The device recited in claim 8, the mounting means being positioned for holding a body adapted for carrying identifying indicia on one side of the plate.

10. The device recited in claim 4, the surface on which the light refracted by the lens is incident being substantially parallel to the plate front face.

11. The device set forth in claim 10, the surface on which the light refracted by the lens is incident being a photographic film.

12. In a method of producing and recording an optical image of papillary ridges on a plurality of body parts, the steps comprising:
contacting a first area on the front face of a transparent plate having front and rear, substantially parallel faces with at least one of the body parts and removing the at least one of the body parts from contact with the front face, thereby producing a latent print of papillary ridges of the at least one body part on the plate front face;
contacting a second area on the front face of the plate with the remainder of the parts;
directing light onto the front face through the rear face of the plate to fall at less than a critical angle on the first and second areas;
and focusing light internally reflected by the plate front face in the first and second areas, which light has exited through the plate rear face, on a photosensitive surface.

13. In a method of producing an optical image of papillary ridges, the steps comprising:
forming a glare area on the front face of a transparent plate having substantially parallel front and rear faces by directing light through the plate rear face onto the front face at less than a critical angle;
substantially eliminating glare from the rear face by coating the same with an optical, anti-reflective, transparent coating;
placing a member with papillary ridges in contact with the front face in the glare area;
and focusing on a surface light internally reflected by the front face in the glare area.

14. A device for producing an optical image of papillary ridges comprising:
a plate made of a transparent material and having front and rear, substantially parallel faces, the front face having a contact area adapted for being contacted by papillary ridges;
a light source positioned to transmit light through the rear face into incidence on the front face at less than a critical angle to form a glare area including the contact area and to be internally reflected by the front face from the glare area and through the rear face, the angle of incidence of the light on the rear face being so related to the index of refraction of the transparent material that the light is refracted into perpendicularity with the front face;
a surface substantially parallel with the plate front face;
and a lens positioned to intercept light from the light source refracted into perpendicularity with and internally reflected by the front face in the glare area of the plate front face through the rear face and to focus the light on the surface, the axis of the lens being substantially perpendicular to the plate front face, said lens being laterally spaced from the path of said light from said light source to said rear face, whereby glare light reflected by the transparent material rear face passes to the side of said lens and light perpendicularly reflected by said front face reaches said lens.

15. A device for producing an optical image of papillary ridges comprising:
a plate made of a transparent material and having front and rear, substantially parallel faces, the front face having a contact area adapted for being contacted by papillary ridges;
an optical, anti-reflective, transparent coating on the plate rear face;
an incompletely silvered mirror spaced from and inclined with respect to the plate;
a light source transmitting light through the mirror onto the plate at substantially zero angle of incidence to enter the plate through the coating and rear face and form on the front face a glare area including the contact area and be internally reflected by the front face from the glare area through the rear face to the mirror;
a surface substantially perpendicular to the plate front face;
and a lens receiving from the mirror light reflected by the same and received by the mirror from the front face glare area, the lens having an axis substantially parallel to the plate front face and being positioned to focus the light received thereby on the surface;
whereby glare light reflection from the plate rear face to the lens is largely eliminated by the coating, and a virtually distortion-free image is formed in the light focused by the lens on the surface upon papillary ridges being placed in contact with the front face, internal reflection of the light by the front face being at substantially zero angle of reflection.

References Cited in the file of this patent

UNITED STATES PATENTS

| | | |
|---|---|---|
| 2,195,699 | Johnson | Apr. 2, 1940 |
| 2,579,961 | Popma | Dec. 25, 1951 |
| 2,730,936 | Fagan et al. | Jan. 17, 1956 |
| 2,817,996 | Meyst | Dec. 31, 1957 |
| 2,866,395 | Manning | Dec. 30, 1958 |
| 2,868,069 | Elmore | Jan. 13, 1959 |
| 2,942,537 | Zimmerman | June 28, 1960 |

FOREIGN PATENTS

| | | |
|---|---|---|
| 432,240 | Germany | July 31, 1926 |